No. 634,893. Patented Oct. 17, 1899.
T. LEE.
ELASTIC OR RESILIENT WHEEL FOR VEHICLES.
(Application filed Mar. 6, 1899.)
(No Model.)

Witnesses
Samuel Stuart
William Preston

Inventor
Thomas Lee

UNITED STATES PATENT OFFICE.

THOMAS LEE, OF PHILADELPHIA, PENNSYLVANIA.

ELASTIC OR RESILIENT WHEEL FOR VEHICLES.

SPECIFICATION forming part of Letters Patent No. 634,893, dated October 17, 1899.

Application filed March 6, 1899. Serial No. 707,845. (No model.)

*To all whom it may concern:*

Be it known that I, THOMAS LEE, a citizen of the United States, residing at Philadelphia, county of Philadelphia, and State of Pennsylvania, have invented a certain new and useful Improvement in Elastic or Resilient Wheels for Automobile or other Vehicles, of which the following is a specification.

My invention relates to a new and useful improvement in elastic or resilient wheels for automobile or other vehicles, and has for its object to so construct a wheel of this description as to render the tread thereof resilient or cushion-backed while using a non-resilient tire; and a further object of my invention is to provide a series of automatic pumps, each being connected with the sectional tire, which will not only provide for the cushioning of said tire, but will instantly supply air under pressure to a reservoir or chamber, which action is effected by the travel of the wheel; a still further object of my invention is to so combine a flexible or sectional tire with a rim as to confine said tire against lateral movements, the strain incident to the tendency to such movements being received and sustained by the rim.

With these ends in view this invention consists in the details of construction and combination of elements hereinafter set forth, and then specifically designated by the claims.

In order that those skilled in the art to which this invention appertains may understand how to make and use the same, the construction and operation will now be described in detail, referring to the accompanying drawings, forming a part of this specification, in which—

Figure 1:
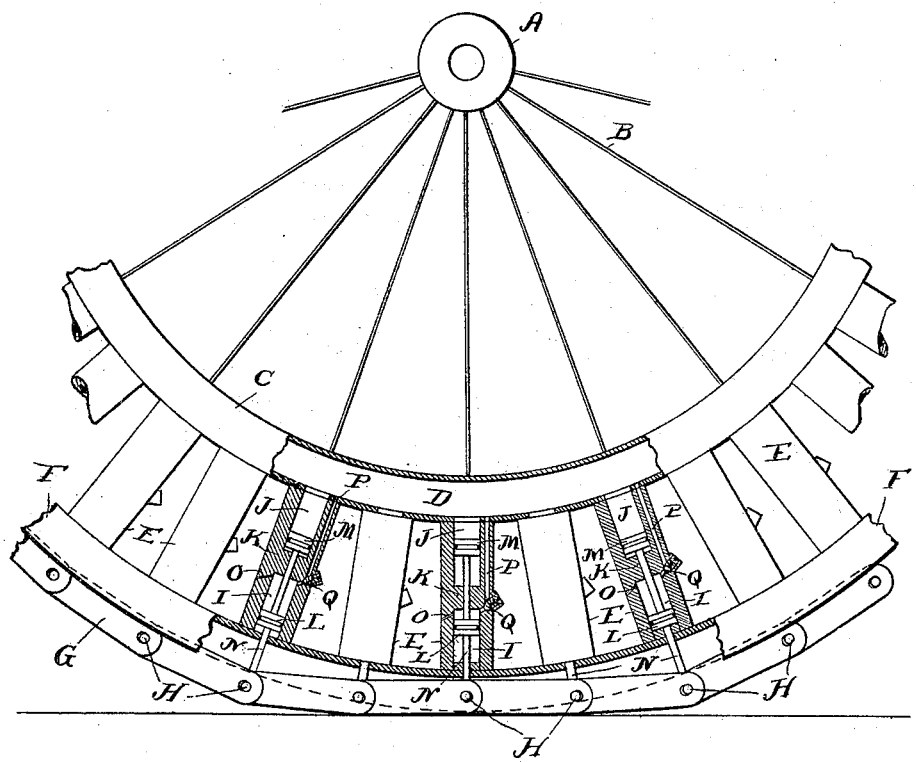
Figure 2:
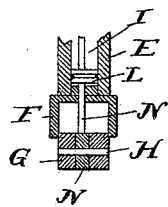

Figure 1 represents a portion of a wheel made in accordance with my improvement, certain of the pumps being shown in section, also a portion of the rim being sectioned away to better illustrate the action of the sectional tire; and Fig. 2, a cross-section of the rim and tire.

In carrying out my invention as here embodied, A represents the hub of the wheel, from which radiate the spokes B, the latter being of any suitable construction, and these spokes are connected with the secondary rim C, which latter is hollow, and the interior thereof forms the compartment or compressed-air reservoir D for the purpose hereinafter set forth.

E represents a series of pump-barrels which radiate from the secondary rim and are attached to the primary rim F, so that the latter becomes a permanent part of the wheel. This primary rim is journaled or of U shape in cross-section for receiving and guiding the tire G, said tire being here shown as composed of lengths pivoted together at the point H. Each of the pumps E is divided into two barrels I and J by the partition K, and two pistons or plungers L and M are fitted in these barrels, respectively, and connected together by the rod N. These rods pass outward through the heads of the pumps and are pivoted to the links of the tire at the points H. A small hole O leads from the outer air to each of the barrels I, so as to permit the air to flow therein when the plunger L moves outward, and a passage-way P leads from each of these barrels to the interior of the compartment D of the secondary rim C. The result of this construction is that when the plunger L is moved inward the air contained in the barrel I will be forced through the passage P to the reservoir D and may be prevented from returning to said barrel upon the outward movement of the plunger by a suitable valve Q, so that when said plunger moves outward it will draw in a fresh supply of air through the hole O.

When the wheel is in position upon a vehicle and is caused to travel in either direction, the links of the tire successively coming in contact with the road-bed and receiving the weight of the wheel and its load will force the plungers L and M inward, and in so doing the former plunger will deliver a certain amount of compressed air to the reservoir D, as just described, and the resistance offered by the compression of this air will act as a cushion to that portion of the tire, and when a pressure has been created in the reservoir D by the continued action of the pumps brought about by travel of the wheel this pressure will also act upon the plunger M, and thereby afford a second cushion, which, in conjunction with the first named, will support the load carried by the wheel and give the effect of a pneumatic tire. A further means of cushioning the tire is the vacuum created behind each of the plungers as they are forced inward.

It is obvious that the heavier the load carried by the wheel the greater will be the compression of the air delivered to the reservoir D, and consequently the greater the pressure against the plungers for the sustaining of said load, by which arrangement the proper cushioning force will be automatically established by the travel of the wheel.

Since the primary rim F houses the sectional tire, said tire cannot be moved sidewise, so that any lateral strain brought thereon will be received and sustained by the sides of this rim, while permitting the links of said tire to move inward and outward in performing their function. At the points where the links are pivoted together a slight longitudinal movement is permitted by the pivot-holes being elongated, so as to provide for the necessary go and come of these links in changing their position from the circular periphery of the tire to the flattened portion thereof in contact with the road-bed, or any other convenient or desirable means may be utilized for this purpose. It will be noted that the action of the sectional tire, in conjunction with the cushioning-plungers, will be such as to tend to reëstablish the general circular form of said tire, and this tendency will cause the links after having been brought in contact with the road-bed to act as a lift or pry upon the rear side of the wheel relative to its direction of travel, thus overcoming any resistance offered to the forward progression of the wheel by the flattening in of the tire, and this action will therefore establish an equilibrium, which will cause the wheel to revolve as readily and freely as though each were provided with a perfectly-concentric solid tire.

In practice the tread of my improved wheel will readily adapt itself to the unevennesses of the road-bed over which it is passing, thus avoiding the lifting of the wheel for such unevennesses, which for certain vehicles is a serious objection. This action of the tire is most marked where the wheel is compelled to travel over railway-tracks or run upon street-railways, since it greatly facilitates the turning of said wheel out of such tracks.

The holes O may be made of such size relative to the capacity of the passages P as to permit only a gradual outflow of air from the barrels I when the plungers are forced inward, while the bulk of this air will be caused to pass through the passage P, or, if desirable, the holes O may have check-valves placed therein which will permit the inflowing of the air to the barrels, but will prevent said air from flowing outward when the plungers are moved inward, or these holes may be entirely dispensed with and the air drawn around or through the plungers L in any well-known or suitable manner. A suitable relief-valve may be connected with the reservoir D, and thereby regulate the amount of pressure accumulated in said reservoir, which in the operations of the wheel would relieve any surplus pressure transmitted thereto by the pump-plungers.

While I have shown a series of pumps arranged between a primary and a secondary rim and spokes running from said secondary rim to the hub of the wheel, I do not wish to limit myself to any particular construction of wheel, since the secondary rim might be dispensed with and the spokes run directly from the hub to the primary rim and certain or all of them be utilized as the plunger-barrels, any suitable reservoir being provided either at the hub or otherwise. For some purposes it might be found advantageous to omit the plungers L, which serve as pumping-plungers, and establish a pneumatic pressure within the reservoir by external means, in which case the sectional tire would be cushioned by this pressure acting upon the plungers P or their equivalents, the gist of my invention resting in the broad idea of providing a sectional tire and connecting the same with plungers acted upon by pneumatic pressure to cushion the links of said tire, and I do not wish to be limited to the minor changes in the construction of my improved wheel, as many such changes might be made without departing from the spirit of my invention—as, for instance, the rods N may be pivoted to the links G at the center thereof instead of at the point where the links are coupled together.

Having thus fully described my invention, what I claim as new and useful is—

1. In combination with a vehicle-wheel, a sectional tire, plungers connected with the links thereof, and means for pneumatically cushioning the links of said tire.

2. In combination with a vehicle-wheel, a flanged rim, a tire composed of links fitted between the flanges of said rim, rods pivoted to the links, plungers carried by the rods, barrels in which said plungers fit, and a reservoir for holding air under pressure connected with said barrels so as to cushion the plungers, as specified.

3. In combination, a suitable reservoir connected with the hub of a wheel, a primary rim connected with the reservoir by a series of pumps, two barrels formed in each of said pumps, plungers fitted in each of the barrels, one series of said plungers adapted to pump air under pressure, while the other series of said plungers are adapted to be acted upon by the air stored in the reservoir to force them outward, a tire composed of links pivoted together and fitted within the primary rim, and rods connected with the plungers and the links, as and for the purpose set forth.

4. In combination with a wheel of the character described, a series of pumps, each having a barrel I and J formed therein, plungers L and M fitted within said barrels respectively, the first-named plungers acting as pump-plungers, means for permitting the inflowing of air to the barrels I when their plungers are moved outward, means for permitting the flow of the air from the last-named barrels when their plungers are moved inward, a reservoir for receiving this outflowing air, valves for preventing the return of the air from the reservoir to said pump-barrels I, a flanged rim, a sectional tire fitted between the plungers of said rim, and rods for connecting the plungers with the sections of the tire, as specified.

5. In combination with a wheel of the character described, a series of twin barrels having plungers fitted therein, one of the series of plungers acting as pumps, and the other series as cushion-plungers, means for maintaining a pneumatic pressure upon the plungers, and means for creating a vacuum behind each plunger whereby the air-pressure will be assisted in supporting the load of the wheel, as specified.

6. In combination with a wheel of the character described, a sectional tire, rods pivoted to the links of said tire, plungers carried by said rods, and barrels in which said plungers are fitted in such manner as to be cushioned by pressure and the forming of a vacuum back of each plunger, as specified.

In testimony whereof I have hereunto affixed my signature in the presence of two subscribing witnesses.

THOMAS LEE.

Witnesses:
M. E. HAMER,
L. W. MORRISON.